United States Patent

Eberhardt

[15] 3,646,265

[45] Feb. 29, 1972

[54] SYSTEM AND METHOD FOR DISCRIMINATING BETWEEN NOISE AND IMAGE SIGNALS

[72] Inventor: Edward H. Eberhardt, Fort Wayne, Ind.

[73] Assignee: International Telephone and Telegraph Corporation, Nutley, N.J.

[22] Filed: Jan. 28, 1970

[21] Appl. No.: 6,629

[52] U.S. Cl. ......................178/7.2, 178/DIG. 12, 178/7.3 S, 325/323, 325/473

[51] Int. Cl. ..........................................................H04n 5/36

[58] Field of Search ....................178/6 NS, 7.3 S, 7.5 S, 7.2; 325/473, 476, 143, 323

[56] References Cited

UNITED STATES PATENTS

| | | | |
|---|---|---|---|
| 3,366,735 | 1/1968 | Hecker | 178/7.2 |
| 3,333,055 | 7/1967 | Krause | 178/6 NS |
| 3,387,221 | 6/1968 | Arberman et al. | 325/65 |

*Primary Examiner*—Robert L. Richardson
*Assistant Examiner*—Richard P. Lange
*Attorney*—C. Cornell Remsen, Jr., Walter J. Baum, Percy P. Lantzy, Philip M. Bolton, Isidore Togut, Charles L. Johnson, Jr. and Hood, Gust, Irish and Lundy

[57] ABSTRACT

An image dissector tube having a plurality of apertures thus providing a corresponding plurality of video signal pulses having a predetermined interval therebetween in response to a small input optical image as opposed to single random noise peaks in the output video signal. In the case of two apertures, the output video signal from the image dissector is delayed by substantially the interval between the paired video signal pulses and the delayed and undelayed signals passed to AND gate, thus providing a single output pulse in response to the paired pulses and supressing noise peaks.

7 Claims, 3 Drawing Figures

Patented Feb. 29, 1972 3,646,265

2 Sheets-Sheet 1

INVENTOR
EDWARD H. EBERHARDT

BY Wood, Herron, Evans & Lundy

ATTORNEYS

Patented Feb. 29, 1972 3,646,265

2 Sheets-Sheet 2

INVENTOR
EDWARD H. EBERHARDT
BY Wood, Herron, Irish & Lundy
ATTORNEYS

SYSTEM AND METHOD FOR DISCRIMINATING BETWEEN NOISE AND IMAGE SIGNALS

BACKGROUND OF THE INVENTION

1. Field of the Invention

This invention relates generally to systems and methods for discriminating between noise signal peaks and image responsive signals in the output of a scanning camera tube.

2. Description of the Prior Art

A conventional image dissector tube inherently has a substantial noise content in its output signal when the tube is exposed to a generally bright field of view, such noise being caused, among other things, by photon fluctuation of the light field itself, cosmic rays, and by imperfections in the tube causing feedback, field emission, surface leakage current and corona discharge. Thus, when an image dissector tube is employed for detecting a small bright image in the field of view, such as a star, or a small dark image, such as a flaw line, either of which normally provides a narrow video signal peak, random noise signal peaks may provide a false signal indication.

It is thus desirable to provide a system and method to discriminate between random noise peaks and a video signal responsive to an actual input optical image.

SUMMARY OF THE INVENTION

The invention in its broader aspects provides a camera tube including means for scanning a field of view and for providing a video signal in response thereto. In order to discriminate between random noise signal peaks in the video signal and a video signal response to an image in the field of view, means are provided for generating at least two video signal pulses having a predetermined time interval therebetween in response to each scanning of an image by the scanning means of the tube, and means are provided for identifying the presence of the two signal pulses in the output video signal and for providing a single output signal pulse in response thereto.

It is accordingly an object of the invention to provide a system for discriminating between noise signal peaks and an image responsive signal in the output of a camera tube.

Another object of the invention is to provide a method for discriminating between noise signal peaks and image responsive signals in the output of an image tube.

The above-mentioned and other features and objects of this invention and the manner of attaining them will become more apparent and the invention itself will be best understood by reference to the following description of an embodiment of the invention taken in conjunction with the accompanying drawings, wherein:

DESCRIPTION OF THE PREFERRED EMBODIMENTS

Figure 1:
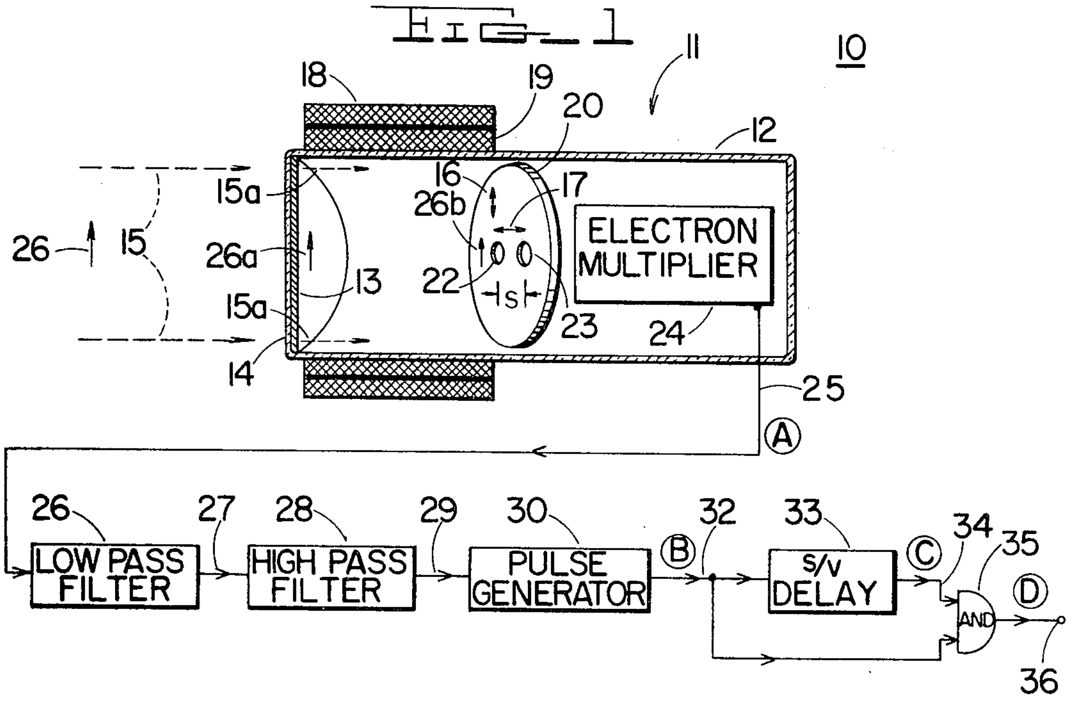
FIG. 1 is a schematic view showing one embodiment of the invention employing an image dissector tube having two apertures.

Referring now to FIG. 1, in one embodiment of the invention, generally indicated at 10, an image dissector tube 11 is provided having an enclosing envelope 12 with a conventional photocathode 13 deposited on the inner surface of its faceplate 14. Photocathode 13 when exposed to a bright field of view, as indicated by the dashed lines 15 having a small optical image 26 therein, will generate an electron image modulated in response to the light image of the field of view impinging thereon, as indicated at 15*a*, 26*a*.

The electron image 15*a*, 16*a* provided by the photocathode 13 is deflected in raster fashion in two dimensions, as indicated by the arrows 16 and 17, by conventional external magnetic deflection coils 18 and 19, and thus the electron image 26*b* of the optical image 26 which impinges on plate 20 is scanned across the plate. In accordance with the present invention, plate 20 has a pair of apertures 22 and 23 therein spaced apart in one of the scanning dimensions, preferably in the horizontal or line scanning dimension 17, by distance "S." Both apertures 22 and 23 are exposed to a single, conventional electron multiplier 24 having an output circuit 25. It will thus be readily apparent that the electron image provided by the photocathode 13 responsive to an optical image in the field of view 15, as shown by the arrow 26*b*, when scanned across apertures 22 and 23 will provide a pair of video signal pulses in output circuit 25. In contrast, random noise signal peaks are not generated in response to scanning of the electron beam, and thus single random noise peaks appear in the output circuit 25. It can be readily seen that the paired image signal pulses are spaced by a time interval S/V where S is the spacing of apertures 22 and 23 and V is the scanning velocity in dimension 17.

The output signal from the image dissector is initially preprocessed in two conventional ways. Output circuit 25 of image dissector 10 is coupled to a conventional low-pass, or high cutoff filter circuit 26. Thus, the very high frequencies contained in the output signal are filtered out so as to remove noise fluctuation signal peaks which are narrower than the desired signal pulses. In effect, filter 26 reduces the magnitude of the upper frequency side of the bandwidth of the dissector output signal as far as possible in order to reduce noise, without excessive reduction in the desired signal. The magnitude of the resulting high frequency cutoff, $f_{max}$ is approximately given by one-half the ratio of the image scan velocity, V, to the width of one aperture, W: $f_{max} \cong V/2W$.

Output circuit 27 of low-pass filter is coupled to a conventional high-pass or low cutoff filter circuit 28 which filters out the low frequency information which is not needed for detecting small optical images. The magnitude of the resulting low frequency cutoff frequency $f_{min}$ is approximately given by one-half the ratio of the scan velocity V to the aperture separation distance, S: $f_{min} \cong V/2S$. This filtering out of the low frequencies in the dissector output signal assures that no low frequency changes in the level of the output signal, i.e., shading, will interfere with the proper triggering of the pulse generator 30, shortly to be described, by establishing an average signal lever continuously above the trigger level or too far below the trigger level.

Output circuit 29 of high-pass filter 28 is coupled to the trigger input circuit of a conventional pulse generator 30 having a selectively adjustable trigger level, or bias discriminator level. The trigger level of pulse generator 30 is set so as to trigger an output pulse in its output circuit 32 each time the filtered dissector output signal exceeds a predetermined level. Thus, a scan across a small optical image 26 to be detected will result in the generation by the pulse generator 30 of two pulses 44,45 separated in time by S/V, as shown in FIG. 2B. Occasional random noise pulses may also trigger pulse generator 30 to provide a single output pulse 46, as shown in FIG. 2B.

While FIG. 2A shows the generation of positive-going dissector output signals resulting from scanning a bright image 26 in the field of view 15, it will be readily understood further that if the image dissector 11 is being employed to detect a darker image 26 on the field of view 15, such as a black flaw line, the image signal pulse pairs will be negative-going.

The output circuit 32 of pulse generator 30 is coupled to a conventional delay circuit 33 which delays all of the output pulses from the pulse generator 30 by the interval S/V. Output circuit 32 of pulse generator 30 and output circuit 34 of the delay circuit 33 are coupled to a conventional AND-circuit 35 which thus compares the delayed and undelayed pulses. It will thus be readily seen that a delayed image signal pulse pair 44D,45D is compared by the AND-circuit 35 with a corresponding undelayed image signal pulse pair 44,45, and since the delay is substantially equal to the interval S/V between the image signal pulse pairs, a single output signal pulse will be provided in output circuit 36. However, it will be readily seen that since the random noise signals appear as single signal peaks 40, the resulting delayed and undelayed pulses 46D,46 applied to AND circuit 35 will not be in coincidence, and thus no output pulse will be provided in output circuit 36.

Figure 2:
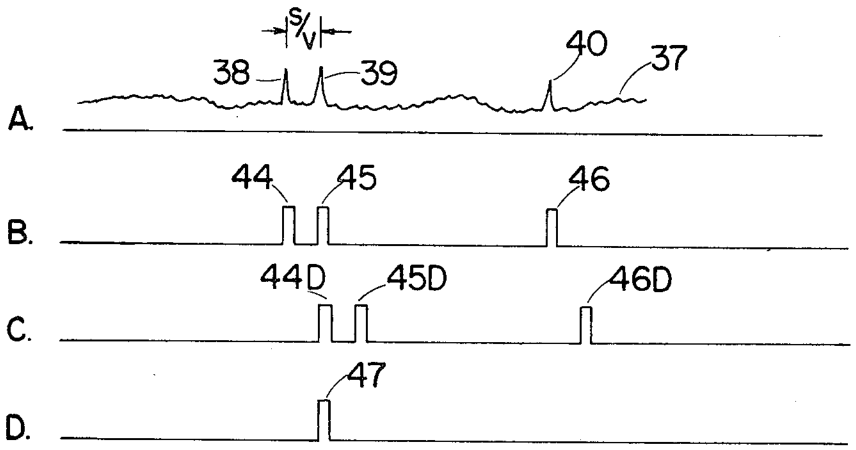
FIG. 2 is a timing diagram useful in explaining the operation of the system of FIG. 1.

Referring now to FIG. 2, a video signal 37 is shown which appears in dissector output circuit 25 in response to scanning of a bright view of field 15, the signal 37 including a pair of image signal pulses 38 and 29 generated by one scanning across apertures 22,23 in dimension 17 of the electron image 26*b* provided by photocathode 13 in response to a bright optical image 26. A typical positive-going random noise peak signal 40 is also shown in signal 37. The output of the pulse generator 30 is shown in FIG. 2B, it being observed that as a result of the high- and low-pass filtering of signal 37 and the triggering level of pulse generator 30, only the image signal pulse pair 44 and 45, and the noise pulse 46 appear. The delayed image signal pulse pair 44D and 45D, and the delayed noise signal pulse 46D appearing in the output circuit 34 of delay circuit 33 are shown in FIG. 2C and it will be readily seen that undelayed image signal pulse 45 and delayed signal pulse 44D find coincidence in AND circuit 35 to provide a single output pulse 47 in output circuit 36, as shown in FIG. 2D.

Figure 3:
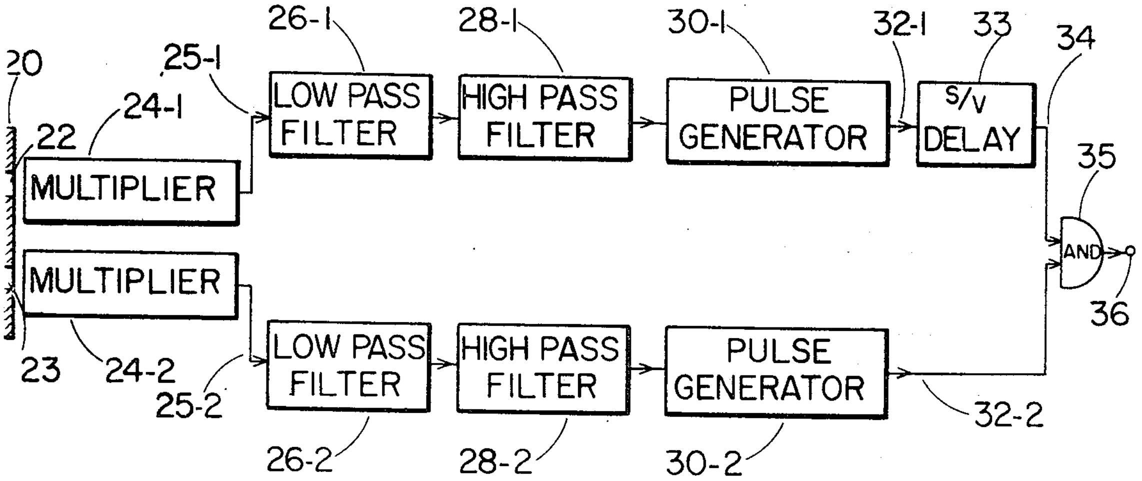
FIG. 3 is a schematic diagram showing a modification of the system of FIG. 1 employing separate multipliers with the two apertures of the image dissector tube of FIG. 1.

Referring now to FIG. 3 in which like elements are indicated by like reference numerals, while both of the image dissector apertures 22 and 23 are exposed to the same electron multiplier 24 in the embodiment of FIG. 1, it will be understood that they may be exposed to separate electron multipliers 24-1 and 24-2 thus, multiplier 24-1 has its output circuit 25-1 coupled to low-pass filter 26-1 which, in turn, is coupled to high-pass filter 28-1, while multiplier 24-2 has its output circuit 25-2 coupled to low-pass filter 26-2 which, in turn, is coupled to high-pass filter 28-2. High-pass filter 28-1 is coupled to pulse generator 30-1 which has its output circuit 32-1 coupled to delay circuit 33. High-pass filter 28-2 is coupled to pulse generator 30-2 which has its output circuit 32-2, along with output circuit 34 of delay circuit 33, coupled to the AND-gate 35. It will be readily apparent that the operation of the system shown in FIG. 3 will be functionally identical to that described above in connection with the system of FIG. 1.

It will now be seen that in accordance with the invention, all image signal pulses appear in groups of at least two with predetermined intervals therebetween whereas, it is extremely unlikely that any random noise pulses will appear in such a group with such an interval. It will be readily seen that the embodiment of FIG. 1 may employ more than two apertures, thus further reducing the probability of the occurrence of the same number of random noise pulses having the same intervals therebetween. While line scanning in dimension 17 of the apertures 22 and 23 in FIG. 1 is suggested, it will be readily apparent that the apertures may be disposed for scanning in the other dimension 16 with appropriated adjustments of the delay provided by delay circuit 33 to provide the requisite S/V delay of the paired image signal pulses.

While there have been described above the principles of this invention in connection with specific apparatus, it is to be clearly understood that this description is made only by way of example and not as a limitation to the scope of the invention.

What is claimed is:

1. A television camera system comprising a camera tube including means for scanning a field of view and for providing a video signal in response thereto, and means for discriminating between random noise signal peaks in said video signal and a video signal in response to a desired optical image in said field of view including means in said camera tube for generating at least two video signal pulses having a predetermined time interval therebetween in response to each scanning of such a desired image by said scanning means, and means for detecting the presence of said two signal pulses in said video signal, said detecting means including means for delaying said video signal pulses by said interval and means for combining the coincident delayed and undelayed signal pulses to provide a single output signal pulse in response thereto.

2. The system of claim 1 wherein said combining means comprises at least one AND circuit.

3. The system of claim 1 wherein said camera tube is an image dissector, and wherein said generating means includes at least two apertures in said image dissector whereby each scanning of said desired image over said apertures generates said two signal pulses.

4. The system of claim 3 wherein said scanning means scans said field of view in raster fashion in two dimensions, said apertures being spaced apart in one of said dimensions by a predetermined distance thereby providing said interval.

5. The system of claim 4 wherein said detecting means includes means for filtering predetermined high and low frequency components from the output signal of said image dissector, pulse generator means coupled to said filtering means for generating pulses in response to filtered signals having at least a predetermined amplitude, means coupled to said pulse generator means for delaying the pulses passed thereby by substantially said interval, and means coupled to said delaying means and to said pulse generator means for combining the coincident delayed and undelayed pulses respectively passed thereby.

6. The method of discriminating between noise signal peaks and a video signal provided in response to a desired optical image scanned by a camera tube comprising the steps of generating from within said camera tube an output signal having at least two video signal pulses with a predetermined time interval therebetween in response to each scanning of such a desired image, delaying said two signal pulses by said interval and combining the coincident delayed and undelayed signal pulses to form a single output signal pulse in response thereto.

7. The method of claim 6 wherein said camera tube is an image dissector, said generating steps comprising scanning the electron image in said tube responsive to an optical image across at least two apertures.

* * * * *